US006168135B1

(12) United States Patent
Fochtman

(10) Patent No.: US 6,168,135 B1

(45) Date of Patent: Jan. 2, 2001

(54) SLOTTED HOUSING FOR FUEL INJECTOR

(75) Inventor: James Paul Fochtman, Williamsburg, VA (US)

(73) Assignee: Siemens Automotive Corporation, Auburn Hills, MI (US)

( * ) Notice: Under 35 U.S.C. 154(b), the term of this patent shall be extended for 0 days.

(21) Appl. No.: 09/079,927

(22) Filed: May 15, 1998

(51) Int. Cl.[7] .................... F16K 31/06

(52) U.S. Cl. .................... 251/129.15; 251/129.21

(58) Field of Search .................... 251/129.21, 129.14, 251/129.15

(56) References Cited

U.S. PATENT DOCUMENTS 3,633,139 * 1/1972 Thompson .................... 335/255
4,474,332 * 10/1984 Kaska .................... 251/129.14
4,812,884 * 3/1989 Mohler .................... 335/258
5,544,816 * 8/1996 Nally et al. .................... 251/129.21

FOREIGN PATENT DOCUMENTS 39 33 758 4/1991 (DE) .

* cited by examiner

*Primary Examiner*—Kevin Shaver
*Assistant Examiner*—Eric Keasel

(57) ABSTRACT

A solenoid actuated fuel injector includes a coil housing surrounding a solenoid coil and forming a part of a magnetic circuit which opens an injection valve when the coil is energized. To accelerate closing of the valve upon deenergizing the solenoid coil, the coil housing has narrow slots extending in the direction of the magnetic field to reduce the development and flow of eddy currents in the coil housing which retard collapse of the magnetic field and closing of the valve. The slots extend perpendicular to the direction of eddy current flow and thus increase the electrical resistance to current flow through the coil housing in this direction. They also reduce the amount of magnetic material in the coil housing and so reduce the amount of eddy currents created during field collapse.

7 Claims, 2 Drawing Sheets

SLOTTED HOUSING FOR FUEL INJECTOR

FIELD OF THE INVENTION

This invention relates to a solenoid actuated fuel injector for internal combustion engines and, in particular, to a fuel injector having a slotted housing that decreases the closing time of the fuel injection valve by reducing motion-retarding eddy currents produced during field decay upon deenergizing of the solenoid.

BACKGROUND OF THE INVENTION

The ability of a fuel injector to open and close rapidly is a significant factor in determining the amount of fuel that is injected into an internal combustion engine. The fuel injector is opened by applying a voltage to a magnetic circuit of a solenoid located within the injector. The magnetic circuit generates a magnetic force. The magnetic force draws upward a valve and armature assembly, thereby opening the injection valve against the force of a return spring and allowing fuel to flow.

Closing of the injection valve by the return spring occurs upon demagnetization of the magnetic circuit of the solenoid. Demagnetization begins upon removal of the power source. As a result, magnetic flux lines decay rapidly. This rapid decay creates undesirable eddy currents which form perpendicular to the magnetic flux lines and are carried by any electrically conductive material in the magnetic field. These eddy currents resist and slow the decay of the flux, causing a slower than desired closing time of the fuel injection valve.

In the past, eddy current loss was largely overcome by making the magnetic material of the solenoid pole or housing of very thin laminations. Each lamination was coated on each side with an insulating material so that no current could flow between the laminations. However, a laminated housing is costly to manufacture.

U.S. Pat. No. 5,207,410, issued May 4, 1993 to the assignee of the present invention, provides grooves or surface slots in the magnetic poles which increase surface area and decrease eddy currents by increasing the length and resistance of the flow path.

SUMMARY OF THE INVENTION

The present invention provides a fuel injector having a solenoid actuated injection valve used to control the injection of fuel into an internal combustion engine. The fuel injector housing is provided with slots through the housing which extend longitudinally and radially in the direction of the lines of magnetic flux and, thus, perpendicular to the direction of flow of eddy currents formed upon decay of the flux field when the solenoid coil is deenergized. These slots significantly reduce the circumferential flow path area of the housing, thus reducing the flow of eddy currents in that direction. However, the saturation strength of the magnetic circuit is not greatly reduced because the slots are relatively narrow and are aligned with the direction of flux lines in the housing.

These and other features and advantages of the invention will be more fully understood from the following detailed description of the invention taken together with the accompanying drawings.

DETAILED DESCRIPTION OF THE INVENTION

Figure 1:
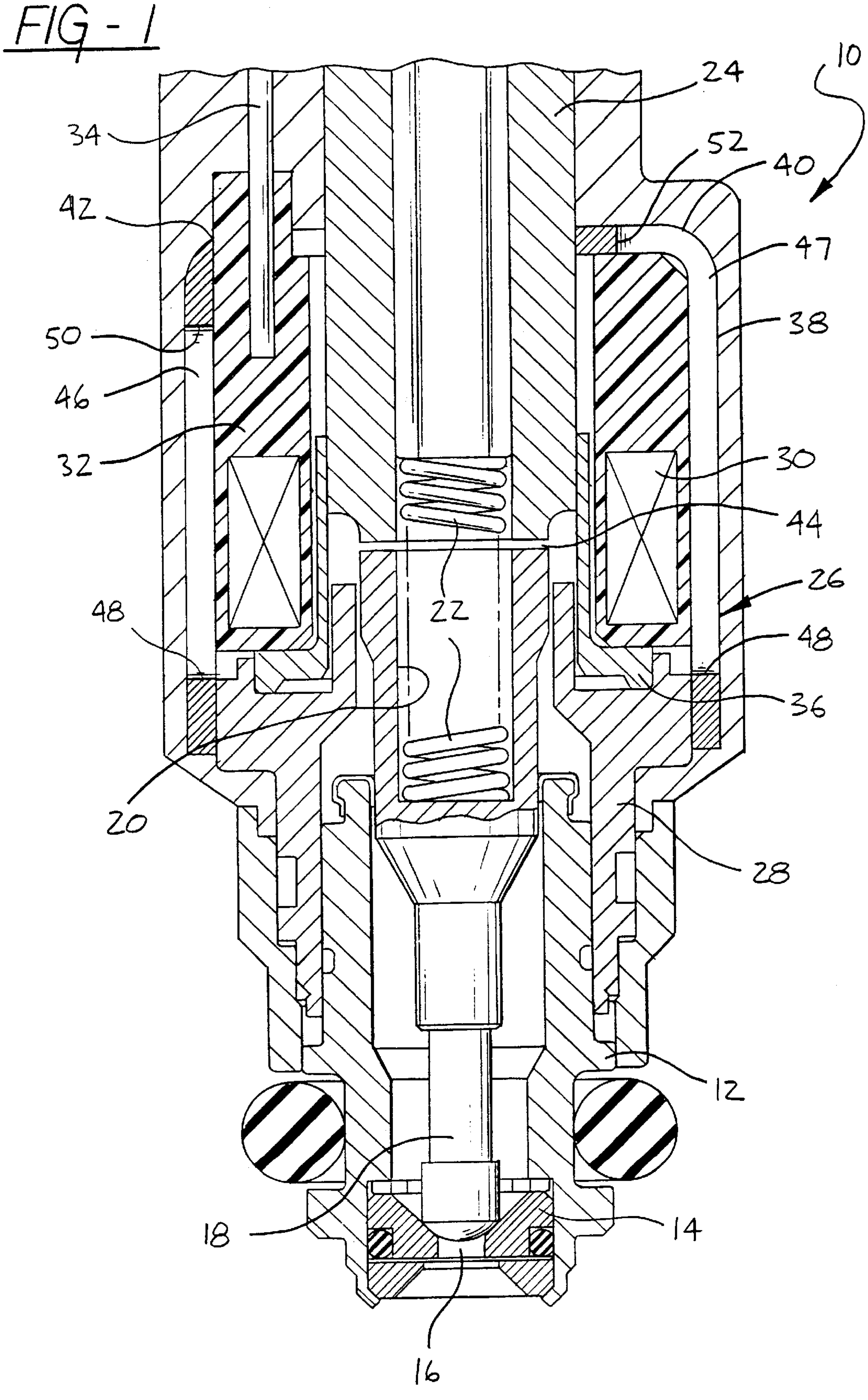
FIG. 1 is a cross-sectional view of a fuel injector embodying one form of the invention.
Figure 2:
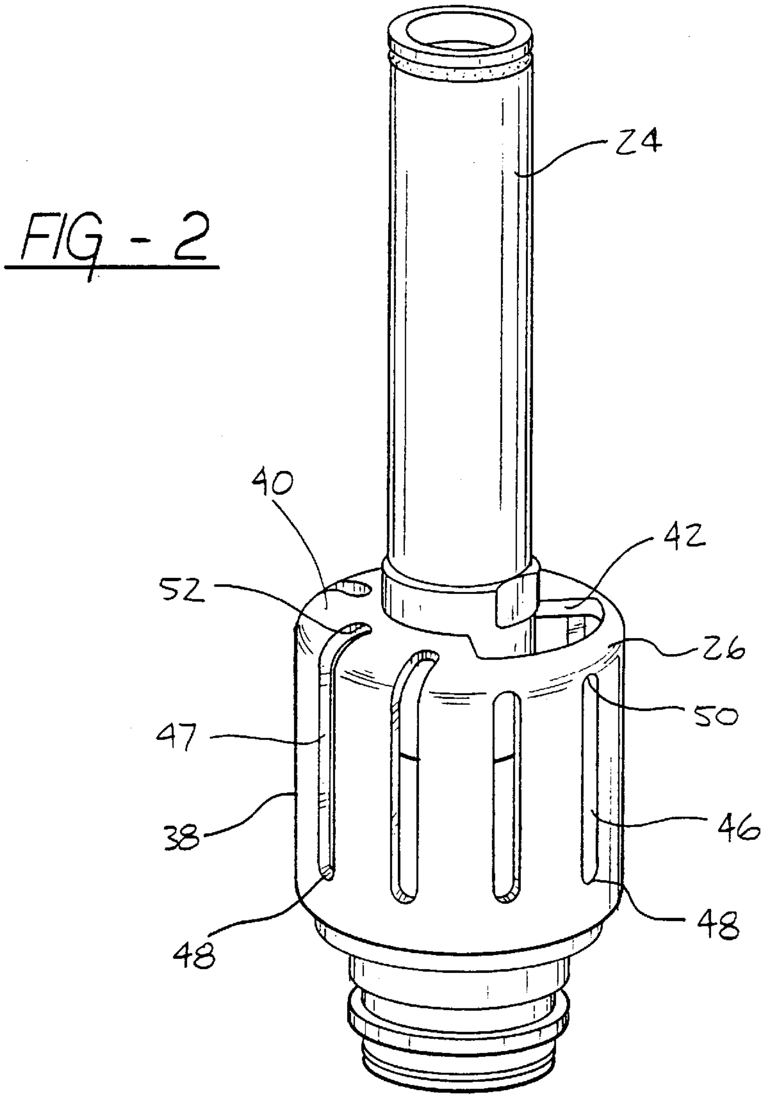
FIG. 2 is a pictorial view of the housing and stator assembly of the injector of FIG. 1.
Figure 3:
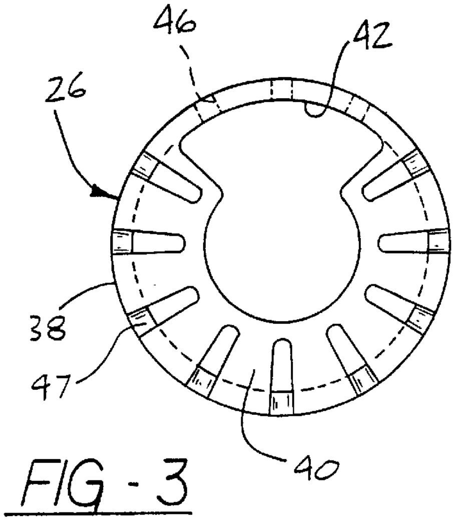
FIG. 3 is a top view of the slotted housing.
Figure 4:
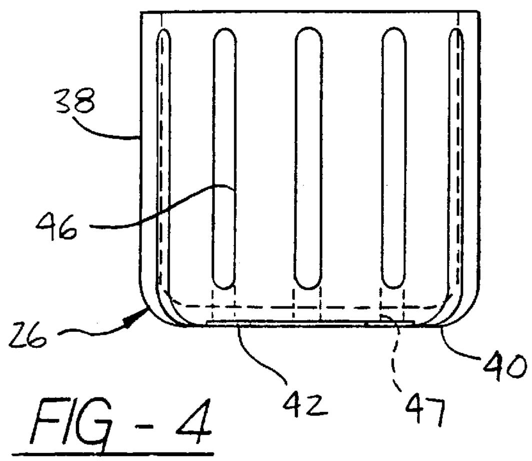
FIG. 4 is a side view of the slotted housing.

Referring now to the drawings in detail, numeral 10 generally indicates a solenoid actuated fuel injector for use in an internal combustion engine. Injector 10 has an injection valve including a valve body 12 containing a valve seat 14 defining an outlet nozzle 16. A valve element 18 is carried for reciprocation within valve body 12 has a spherical end engagable with a conical surface of the valve seat 14 to close the nozzle 16. The valve element 18 is connected with an armature 20 that is axially movable with the valve element 18. The armature and valve element 18 are biased by a return spring 22 to urge the valve element 18 toward a valve closed position.

A solenoid coil assembly is provided including a tubular stator 24, a generally cylindrical coil housing 26, a valve body shell 28, and solenoid coil 30 wound around a plastic bobbin 32 enclosed radially within the coil housing 26. Electrical terminals 34 supported by the bobbin 32 are connected with the coil 30 for providing energizing voltage thereto. A non-ferromagnetic shell 36 connects the valve body shell 28 with the stator 24 inwardly of the coil 30. The coil housing 26 is made up of a generally cylindrical side 38 extending upward from the valve body shell 28 and integrally connected with a radial end 40 engaging the stator 24. A terminal opening 42 is provided in the radial end 40 for passage of the electrical terminals 34 to the exterior of the coil housing 26.

When the coil 30 is energized, a magnetic field is developed that forms a magnetic circuit extending axially through stator 24, radially outward and axially downward through housing 26, radially inward through valve body shell 28, across a small radial clearance through armature 20 and across an axial working gap 44 between the armature 20 and the stator 24. A magnetic attraction is thereby created which draws the armature 20 to the stator 24 against the force of the return spring 22, closing the gap 44, opening the injection valve, and allowing fuel to spray from the nozzle 16.

In order to close the injection valve, the solenoid coil 30 is deenergized, allowing the magnetic field to collapse. However, the motion of the collapsing field generates eddy currents in the magnetic circuit which delay the collapse of the magnetic field and thereby retard the closing action of the injection valve.

In accordance with the present invention, the coil housing 26 is provided with relatively narrow axially extending circumferentially spaced slots 46, 47 having lower ends 48 spaced from a lower end of the coil housing. Some of the slots 46 which are in alignment with the terminal opening 42 have upper ends 50 which are spaced below and adjacent an upper end of the cylindrical side 38 while the remaining slots 47 have upper ends 52 which extend inwardly into the radial end 40 and are spaced radially outward from the adjacent stator 24 and the connected inner diameter of the radial end 40. Alternatively, slots 47 could be made the same length as slots 46.

The slots 46, 47 extend perpendicular to the direction of eddy currents generated in the coil housing 26 and thus reduce the flow of eddy currents by increasing the resistance to their flow through the coil housing 26. In addition, the reduction of magnetic material in the coil housing 26, resulting from the slots 46, 47, reduces the amount of eddy currents created in the coil housing 26. The reduction in the amount and flow of eddy currents in the coil housing 26 reduces the delaying effect of the eddy currents on the collapse of the magnetic field. Accordingly, the magnetic field collapses at a faster rate and allows the return spring to more quickly close the injection valve and cut off fuel flow. It is recognized that a larger number of smaller slots is preferable to fewer larger slots but manufacturing considerations suggest a practical limit on the number of slots provided. For example, housing 26 shows only twelve slots of medium width.

The design of a magnetic circuit for a solenoid actuated fuel injector requires attention to the flux carrying capacity of every element of the circuit. This requires consideration of the saturation flux density of the magnetic material of each component and the cross-sectional area of the path of the magnetic field through each component. Because the coil housing has a relatively large cross-sectional area for magnetic flow, as a result of its size, the cutting of axial and possibly radial slots 46 may be accomplished without greatly increasing resistance to the magnetic flux field through the coil housing 26. At the same time, the longitudinally extended slots 46 provide considerable resistance to the circumferential flow of eddy currents through the coil housing 26. A balancing of the design characteristics is required to provide a desired reduction in eddy currents while avoiding limitation of the flux carrying capacity of the magnetic circuit.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A solenoid actuated fuel injector comprising:

a tubular stator extending along an axis;

an armature connected with a valve element and movable along said axis toward and away from an end of the stator between a valve open position and a valve closed position;

a solenoid coil surrounding the stator;

a resilient element biasing the armature away from the stator toward the valve closed position, the armature being magnetically attracted toward the stator to the valve open position upon energizing the coil; and a coil housing having a cylindrical portion connected at one axial end with the stator, the housing and the stator forming a portion of a magnetic circuit in which a magnetic field is developed upon energizing the solenoid coil, said magnetic circuit extending parallel to the axis through the cylindrical portion of the housing, the cylindrical portion including:

a first part encircling the solenoid coil and stator, and a second part having a plurality of slots extending between the first part and the one axial end, said slots being circumferentially spaced around the second part;

whereby upon de-energizing the solenoid coil, circumferentially directed eddy currents, which are generated by magnetic field decay, are minimized by the plurality of slots which are arranged perpendicular to the circumferentially directed eddy currents and which reduce magnetic material in the housing, such that magnetic field decay and movement toward the valve closed position are accelerated.

2. The fuel injector of claim 1 wherein said housing includes a radial end portion at said one axial end, said radial end portion forming said connection between the cylindrical portion and said stator.

3. The fuel injector of claim 2 wherein at least some of said slots extend from said cylindrical portion into said radial end portion.

4. The fuel injector of claim 3 wherein said at least some of said slots have ends spaced inwardly adjacent an inner edge of said radial end portion and axially adjacent an opposite axial end of said cylindrical portion.

5. The fuel injector of claim 3 wherein said radial end has a terminal opening through which extend electrical terminals from said coil.

6. The fuel injector of claim 5 wherein some of said slots are in axial alignment with said terminal opening and have ends spaced adjacent said terminal opening.

7. The fuel injector of claim 1 wherein the total width of said slots at any cross-section of the housing is such that the flux carrying capacity of the housing is not significantly less than the flux carrying capacity of the stator.

* * * * *